United States Patent Office 3,513,152
Patented May 19, 1970

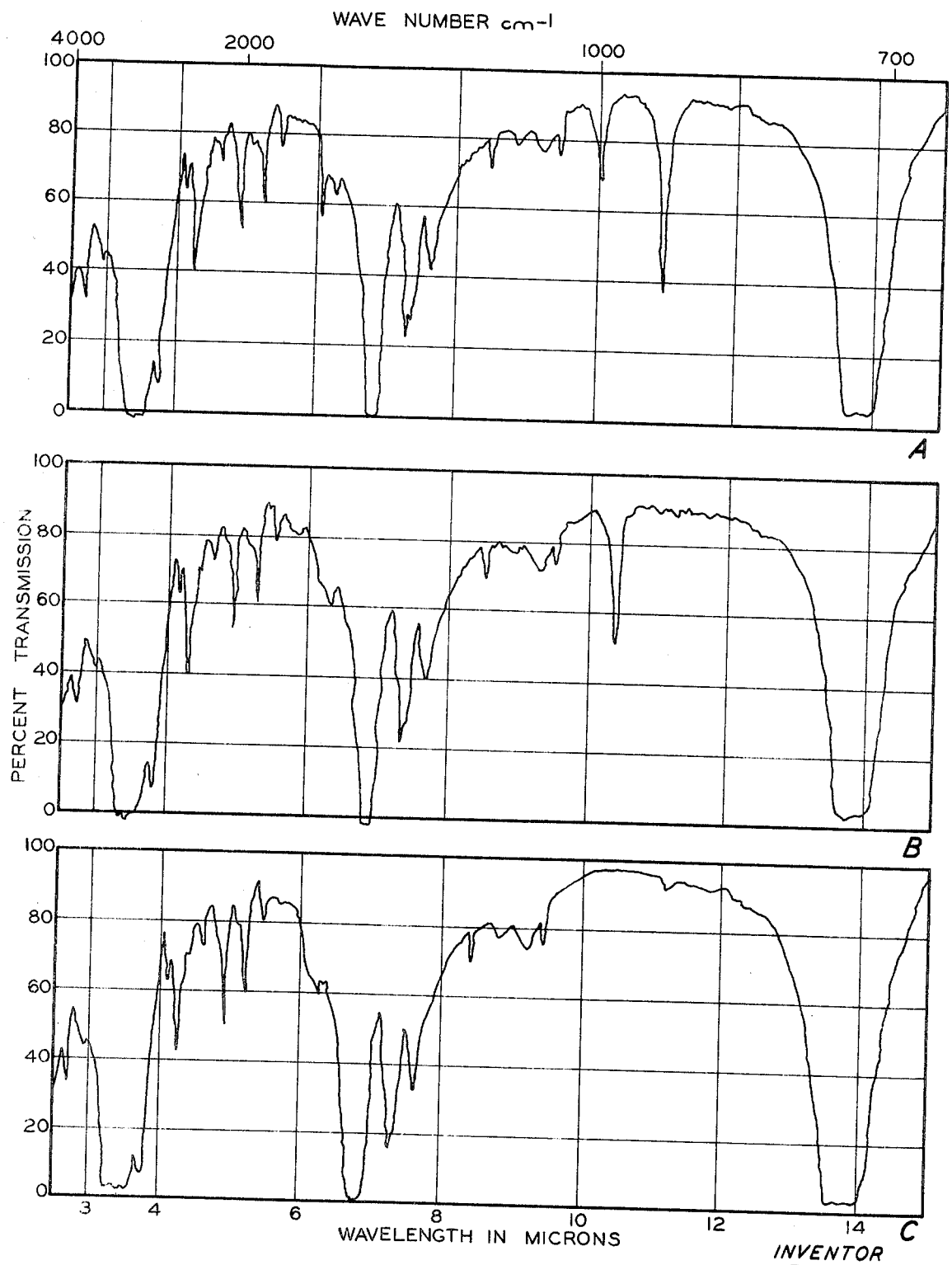

3,513,152
THERMALLY STABLE OLEFIN POLYMER
John Paul Hogan, Bartlesville, Okla., assignor to Phillips Petroleum Company, a corporation of Delaware
Filed Apr. 29, 1966, Ser. No. 546,311
Int. Cl. C08d 5/00
U.S. Cl. 260—94.9          10 Claims This invention relates to an improved form of polyethylene which has excellent thermal stability. In another aspect, this invention relates to a method of treating an olefin polymer to improve its resistance to melt index change at elevated temperatures.

Linear polyethylene having a narrow molecular weight distribution is described in U.S. 3,130,188. Polymers of this type are highly desirable for molding or extrusion operations where melt elasticity and resistance to flow at low shear rates should be minimized. Such polymers, however, have evidenced a thermal instability of a type which apparently does not involve a chemical reaction with oxygen since antioxidants, even at high levels, are ineffective in overcoming this particular problem. This type of thermal instability which is of special significance in the polyethylenes of narrow molecular weight distribution is characterized by a decrease in the melt index of the polymer on heating or processing at temperatures in the range of about 370 to 600° F.

I have now discovered a method of treating such polymers whereby a new and unique form of polyethylene is provided. This new polyethylene has exceptional thermal stability as evidenced by its ability to exhibit substantially no change in melt index on heating for 60 minutes at 374° F. This improvement is obtained without forfeiting the desirable properties of the commercial resin; for example, its crystallinity, hardness, abrasion resistance, melting point, environmental stress cracking resistance and stress strain properties.

According to my invention the treatment which modifies the polyethylene with respect to the thermal stability characteristics disclosed above is effected by contacting the polymer with a catalyst of a reducing metal compound as subsequently defined and a salt of a Group VIII metal, preferably a nickel salt of an organic acid. In one aspect of the invention the treatment is carried out in the presence of sufficient hydrogen to saturate the double bonds which are present in the polymer. In still another aspect, the treatment is carried out in the presence of a small but promoting amount of hydrogen which is substantially less than the stoichiometric amount required to saturate the polymer. This treatment can also be applied to polymers of other 1-olefins in order to improve their thermal stability.

The novel polyethylene provided by my invention has a density of at least 0.94 gram per cubic centimeter, a melt index in the range of 0.1 to 50, a weight average molecular weight of 40,000 to 160,000, a molecular weight distribution as indicated by a ratio of weight average to number average molecular weight $M_w/M_n$ of 3 to 6 and an infrared spectrum showing an absence of absorption bands at 10.1 and 11 microns.

It is an object of this invention to provide an improved polyethylene resin which can be used in a variety of molding operations where elevated temperatures are required without undergoing a change in its response to the molding conditions. It is a further object of this invention to provide a polyethylene resin which does not undergo substantial decrease of melt index when subjected to elevated temperatures such as those encountered in conventional molding operations. Another object of the invention is to provide a method of treating polyethylene and other olefin polymers in order to improve their thermal stability. Other objects, advantages and features of my invention will be apparent to those skilled in the art in the following discussion and drawing which shows a comparison of the infrared spectra which characterizes the unmodified polymer (spectrum A) and the polyethylene resins provided by the invention (spectra B and C).

The process of my invention can be used to treat any polymer of a mono-1-olefin having 2 to 8 carbon atoms per molecule in order to improve its thermal stability. Examples of such monomers include ethylene, propylene, 1-butene, 1-octene, 4-methyl-pentene-1, and the like. The process is preferably applied to linear ethylene polymers and is of particular significance with respect to those polyethylenes of narrow molecular weight distribution such as can be obtained by the process described in U.S. 3,130,188. The linearity of the polyethylene is indicated by its density which must be at least 0.94 gram per cubic centimeter (ASTM D 1505–63T). Preferably the polymer has a density in the range of 0.950 to 0.965 gram per cubic centimeter. A number of methods of preparing linear polyethylenes of this type are known such as those made by the process described in U.S. Pat. 2,825,721. Other known methods employ organometal catalyst systems. Although the polyethylene is preferably a homopolymer, it is within the scope of this preferred aspect of my invention to employ polymers in which a small amount of 1-olefin such as propylene, butene-1, octene-1, 1,3-butadiene, or the like, preferably mono-1-olefins, are copolymerized with the ethylene. Since these comonomers, even in relatively small amounts, tend to reduce the density of the polymer, the amount of such comonomer which can be tolerated is limited by the desired density as given above.

The melt index of the polymer can range from 0.1 to 50, but is normally at least 1 and is preferably in a range of 5 to 40 (ASTM D 1238–62T, Condition E). The weight average molecular weight is in the range of 40,000 to 160,000 and preferably in the range of 45,000 to 70,000 and the ratio of weight average to number average molecular weight is from 3 to 6, preferably from 4 to 5. This ratio is a measure of the molecular weight distribution of the polymer and indicates a narrow molecular weight distribution as compared with most of the commercial polyethylene resins which have a higher ratio. Both the weight average and number average molecular weight as used in this specification and in the claims are determined by gel permeation chromatography (GPC), as described by J. C. Moore and J. G. Hendrickson, Journal of Polymer Science, part C. vol. 8, pp. 233–241 (1965). The GPC method was calibrated using narrow molecular weight hydrogenated polybutadienes whose weight average molecular weight had been determined by light scattering and whose number average molecular weight had been detemined by ebulliometry.

The polyethylenes which are treated according to my invention have an infrared spectrum which preferably corresponds to that shown by spectrum A of the drawing. According to this invention, the spectrum analysis is determined by infrared scanning in a Perkin-Elmer Model 137 Infracord having a sodium chloride prism. Molded discs of polymer 1⅛ inches in diameter and 300 to 500 microns thick are used. The infrared spectra analyses were made by comparing the spectra for the experimental polymers with those for normal olefins such as 1-hexadecene, trans-3-heptene, and the like.

Polyethylenes of the type treated according to my invention contain about 1 to 1.5 double bonds per 1000 carbon atoms. As indicated by the infrared spectra analyses of the polyethylenes before and after treating, modification of the polymer occurs with respect to this very small amount of unsaturation. It was quite surprising that such a small change in the structure of the polymer could have such a major effect in its behavior during molding in which elevated temperatures are required. The unsaturation present in the polymer prior to treatment is of the terminal vinyl type as indicated by the intensity of the absorption bands at about 10.1 and 11.0 microns (spectrum A). That the treatment according to my invention results in the substantial elimination of terminal vinyl unsaturation is apparent from the spectra B and C. From spectrum B it can be seen that there is no indication of absorption at 10.1 and 11 microns. On the other hand, the intensity of the absorption band at 10.35 microns indicates trans-internal unsaturation, which apparently does not result in the type of thermal instability which characterizes the untreated polyethylene. As indicated by spectrum C, polymer which is treated according to the invention with hydrogen present in amount sufficient to saturate the double bonds in the polymer exhibits no absorption bands from 10.1 to 11.0 microns. It is within the scope of this invention to effect a treatment which reduces the unsaturation in the polymer while substantially eliminating the terminal vinyl unsaturation, so that the amount of remaining trans-internal unsaturation is less than the amount of terminal vinyl unsaturation originally present. Polymer stability is obtained by eliminating 70 percent or more of the terminal vinyl unsaturation.

It is desirable to treat the polymer in solution, preferably while dissolved in a hydrocarbon solvent such as paraffins, cycloparaffins or aromatics or any mixture of these materials. Examples of suitable solvents include n-pentane, n-octane, cyclohexane, benzene, toluene, and the like or mixtures of these. The polymer concentration in the solvent can vary over a relatively wide range, and can be as low as 1 weight percent although concentrations of about 5 to 25 weight percent are preferred.

The catalyst system which is used employs two components, one being a reducing metal compound which can be represented by the formula $MR_n$ wherein M represents a metal of Group I-A, II-A or III-A of the Periodic System as shown on page B-2 of the Handbook of Chemistry and Physics, 45th edition, published by the Chemical Rubber Company in 1964, $n$ is the valence of the metal M, and each R is hydrogen or a hydrocarbyl radical having 1 to 20 carbon atoms such as alkyl, cycloalkyl, aryl or combinations thereof. Typical compounds representative of this component for the catalyst system include triisobutylaluminum, triethylaluminum, trieicosylaluminum, dicyclohexyl(phenyl)aluminum, 1-anthracenylpotassium, di-3-phenanthrylberyllium, n-butyllithium, dimethylmagnesium, di-n-propylbarium, tri-n-pentylgallium, diisobutylaluminum hydride, sodium hydride, aluminum hydride, and the like.

The second component of the catalyst system is a metal ester having the formula

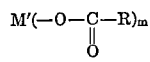

in which M' is a Group VIII metal; R has the same meaning as in the formula for the first component; and $m$ is the valence of M'. The second component is preferably a nickel ester. Typical compounds are nickel stearate, nickel acetate, nickel propionate, nickel formate, nickel octoate, nickel benzoate, nickel naphthenate, and the corresponding iron, cobalt, palladium, and platinum esters such as ferric stearate, cobalt naphthenate, cobalt octoate, and the like. Of this group nickel stearate, nickel octoate, and nickel naphthenate are the presently preferred compounds.

It is preferred to use the nickel salts of organic acids having 5 to 20 carbon atoms, preferably branched, because they are more readily soluble in the treating mixture. Lower molecular weight acid salts, however, such as nickel acetate can be used and one method of improving the physical form of such materials for use in this process is to grind the nickel acetate with mineral oil to form a very fine slurry prior to combining it with the reducing metal compound.

The catalysts are prepared by mixing the components in a solvent, for example the hydrocarbon solvent to be used for the treating medium. Catalyst poisons such as oxygen, water or the like should be avoided. The ratio of the reducing metal component to the Group VIII metal compound on a molar basis is generally in the range of 0.1 to 10 and preferably in the range of 0.5 to 5 mols per mol. The concentration of the catalyst in the reaction mixture is generally in the range of 0.001 to 10 weight percent based on the polymer and preferably in the range of 0.002 to 5 weight percent. Greater or lesser amount of catalyst can, however, be used.

The polymer, preferably in solution, is contacted with the catalyst under conditions which include temperatures in the range of about 50 to 500° F. and gauge pressures up to about 1000 pounds per square inch. The reaction time can vary anywhere from 1 minute to 25 hours or more and the reaction can be in either a batch or continuous operation. Preferred conditions are temperatures of 170° to 400° F., pressures of 10 to 500 pounds per square inch gauge and reaction times of about 10 minutes to 10 hours. When treating the polymer in solution the pressure is usually that sufficient to maintain the reaction mixture substantially in the liquid phase.

As explained above, hydrogen may or may not be present in the polymer treatment but it is preferred that at least a promoting amount of hydrogen be used. If no hydrogen is employed or if the amount used is substantially less than that required to saturate the polyethylene, the product which results will have an infrared spectrum as shown by scanning B of the drawing. On the other hand, if the amount of hydrogen present is greater than stoichiometric, the polymer resulting will have an infrared spectrum as shown by scanning C of the drawing. It is of advantage, of course, to use as little hydrogen as possible but the presence of some hydrogen is advantageous since the time for the reaction can be considerably reduced in this manner. Less than 5 percent of the stoichiometric amount of hydrogen required for hydrogenation of the polymer is sufficient to promote complete modification thereof. In fact, the conversion can be promoted by pretreating the catalyst with hydrogen prior to the time at which it is contacted with the polymer. It is believed that under these conditions no free hydrogen is present in the reaction mixture with the polymer but the treatment is nevertheless greatly accelerated.

One of the advantages of this invention is that the polymer is converted to a thermally stable form without the introduction of methyl branches. The linearity of the polymer is thereby maintained together with the desirable physical properties that make this type of polyethylene attractive to fabricators. Elimination of terminal vinyl unsaturation, of course, introduces a methyl group in the polymer in its place as indicated by enhancement of the faint shoulder on the infrared scanning at about 11.22 microns. This, however, does not indicate methyl branching. It is one of the distinct advantages of this particular method of treatment that the desirable properties of the polymer are not altered while its thermal stability is improved. Since the polymer does not undergo a change in melt index during molding at elevated temperature, its molecular weight distribution remains narrow and it thereby has improved resistance to warpage. This advantage is especially apparent in the injection molding of relatively large, thin items such as plates for dinnerware, container covers and the like.

The polymers can be recovered from the solution in which they are treated by any well known recovery technique such as precipitation of the polymer by cooling or water dilution or by removing the solvent by evaporation. The catalyst residues can be washed from the polymer by well known methods. One method for reducing the amount of catalyst residue in the polymer is to add water or oxygen to the solution in order to precipitate the organometal component as a hydroxide. This is of particular advantage when using organoaluminum components in the catalyst. The precipitate can then be removed by filtration, decantation or other suitable method.

The polymer is well suited for preparation of articles by conventional extrusion or compression molding processes for the fabrication of items such as fibres, films, gaskets, tubing, cording materials, protective coatings such as on wire, laminates and the like. The polymer can be compounded with known plasticizers, fillers and other additives such as antioxidants, UV stabilizers, antistatic agents, and the like.

Advantages of my invention are illustrated by the following examples.

EXAMPLE I

Polyethylene prepared by a process as described by U.S. Pat. 3,130,188, using a fluorided chromium oxide-contacting catalyst, having a melt index of 35, a density of 0.96 gram per cubic centimeter, a weight average molecular weight of 53,900, a ratio of weight average to number average molecular weight of 4.2 and an infrared spectrum as shown by scanning A of the drawing was treated in solution with a catalyst of triethylaluminum and nickel octoate. The nickel octoate used in this and succeeding examples was nickel 2-ethylhexoate. The polymer unsaturation was about 1.1 double bonds per 1000 carbon atoms. Ninety grams of the polymer was dissolved in 567 grams of cyclohexane at 230° F. The amount of nickel octoate was 0.0045 gram which was 50 p.p.m. of nickel based on the polymer. The amount of triethylaluminum was 0.027 gram to provide a ratio of aluminum to nickel of 3/1. When the polymer was dissolved, 7 milliliters of hydrogen, which was 5 percent of the stoichiometric amount required to saturate the polyethylene, was flushed into the reactor with 113 grams of cyclohexane and the temperature was raised to 300° F. The pressure was about 250 p.s.i.g. After 15 minutes' reaction time the polymer was recovered. The recovered polyethylene had essentially the same density and melt index as the original polymer but the infrared spectrum was as shown by scanning B of the drawing. The weight average molecular weight of the recovered polymer was 53,900 and the ratio of weight average to number average molecular weight was 4.4.

A second sample of the unmodified polyethylene as described above was treated in a 1400 milliliter reactor by dissolving 90 grams of the polyethylene in 500 grams of cyclohexane, heating the solution to 330° F. and adding 0.027 gram of nickel octoate and 0.027 gram of triethylaluminum. Sufficient hydrogen was then added to increase the pressure by 30 p.s.i. The reaction was complete after 15 minutes and the recovered polymer was found to be essentially unchanged in density and melt index, having a weight average molecular weight of 56,200 and a ratio of weight average to number average molecular weight of 4.5. The infrared spectrum of this polymer was as shown by scanning C of the drawing.

EXAMPLE II

Polyethylene of the type described in Example I except having a melt index of 19 was treated as a 6 weight percent solution in cyclohexane at 275° F. and 80 p.s.i.g. hydrogen pressure for 2 hours using 0.0055 weight percent nickel stearate and sufficient triethylaluminum to provide a 4 to 1 mol ratio of aluminum to nickel. Samples of the polymer before and after treating were tested for warping tendencies by molding discs of approximately 55 grams and determining the weight range over which the total weight of polymer injected into the mold could be varied without causing the disc to warp.

At a molding temperature of 550° F., warping could not be eliminated by varying the polymer weight with the untreated polyethylene, while with the treated polymer the weight could be varied by 3.7 grams (about 7 percent) without warping.

Samples of the treated and untreated polymer were also tested for melt index decrease by heating the polymers for various lengths of time at 374° F., and then determining their melt index. Results were as follows:

| Heating time (minutes) | Melt index | |
|---|---|---|
| | Untreated polymer | Treated polymer |
| 5 | 18.8 | 19.2 |
| 10 | 17.4 | 19.2 |
| 20 | 16.8 | 19.2 |

The above data indicate that the treated polymer is substantially more resistant to melt index change than the untreated polymer and further is less subject to warping tendencies during molding.

EXAMPLE III

Forty grams of an ethylene homopolymer prepared by the process of U.S. 2,825,721 was treated in cyclohexane solution at 260 to 300° F. for 3 hours with 0.12 gram of nickel stearate and 0.05 gram of triethylaluminum. No hydrogen was present. Properties of the polymer before and after the treatment were:

| | Unsaturation,[1] C=C/1,000 C atoms | | Melt index [2] |
|---|---|---|---|
| | Terminal | Internal | |
| Before | 1.4 | <0.1 | 0.264 |
| After | 0.4 | 1.0 | 0.465 |

[1] Infrared analysis.
[2] ASTM D 1238–62T, Condition E.

The tendency of the polymer to undergo a melt index decrease during heating was minimized by the treatment:

| | Preheating time in melt indexer at 374° F. (sec.) | Melt index | Percentage decrease |
|---|---|---|---|
| Before treatment | [1] 400 | 0.264 | |
| | 600 | 0.238 | |
| | 1,200 | 0.190 | 28 |
| After treatment | [1] 400 | 0.465 | |
| | 600 | 0.438 | |
| | 1,200 | 0.440 | 5 |

[1] Standard preheating time.

As it will be evident to those skilled in the art, various modifications can be made in my invention without departing from the spirit and scope thereof.

I claim:

1. Polyethylene having a density of at least 0.94 gram per cubic centimeter, a melt index of 0.1 to 50, a weight average molecular weight of about 40,000 to 160,000, a ratio of weight average to number average molecular weight of 3 to 6, and an infrared spectrum showing an absence of absorption bands at 10.1 and 11 microns.

2. The polyethylene of claim 1 wherein the infrared spectrum is as shown by scanning B of the drawing.

3. The polyethylene of claim 1 wherein the infrared spectrum further shows an absence of absorption at 10.35 microns.

4. The polyethylene of claim 3 wherein the spectrum is as shown by scanning C of the drawing.

5. A polyethylene of claim 1 further characterized by a density in the range of 0.950 to 0.965 gram per cubic centimeter, a melt index in the range of 5 to 40, a weight average molecular weight in the range of 45,000 to 70,000, a ratio of weight average to number average molecular weights of 4 to 5 and showing substantially no change in melt index on heating for 60 minutes at 374° F.

6. A method of treating polymer of a mono-1-olefin, which polymer has been formed using a chromium oxide-containing polymerization catalyst, to improve its thermal stability which comprises contacting said polymer in a solution consisting essentially of said polymer and a hydrocarbon solvent, with a catalyst which forms on mixing a reducing metal compound having the formula $MR_n$ wherein M is a metal of Group I–A, II–A, or III–A of the Periodic System, $n$ is the valence of the metal M and each R is hydrogen or a hydrocarbyl radical having 1 to 20 carbon atoms, and a Group VIII metal salt, and recovering the polymer thus modified having no more than 30% of the terminal vinyl unsaturation originally present.

7. The process of claim 6 in which more than a stoichiometric amount of hydrogen is present, sufficient to saturate said polymer.

8. The process of claim 6 wherein said polymer is linear polyethylene and said catalyst components are trialkylaluminum and a nickel salt of an organic acid having 5 to 20 carbon atoms.

9. The process of claim 8 wherein the catalyst is triethylaluminum and nickel octoate, the polyethylene treated has a density of about 0.96 gram per cubic centimeter, a molecular weight of about 45,000 to 70,000, a ratio of weight average to number average molecular weight of about 4 to 5, and an infrared spectrum as shown by scanning A of the drawing, and the treating conditions include a temperature of about 170 to 400° F., a pressure of 10 to 500 p.s.i.g., a reaction time of 10 minutes to 10 hours, a catalyst concentration of 0.002 to 5 weight percent nickel compound based on the polymer and a ratio of aluminum to nickel in the catalyst system of 0.5 to 5 mols per mol.

10. A method of treating polymer of a mono-1-olefin to improve its thermal stability which comprises contacting said polymer in a solution consisting essentially of said polymer and a hydrocarbon solvent, with a catalyst which forms on mixing a reducing metal compound having the formula $MR_n$ wherein M is a metal of Group I–A, II–A, or III–A of the Periodic System, $n$ is the valence of the metal M and each R is hydrogen or a hydrocarbyl radical having 1 to 20 carbon atoms, and a Group VIII metal salt, in the presence of a small but promoting amount of hydrogen substantially less than the stoichiometric amount required to saturate said polymer, and recovering the polymer thus modified having no more than 30% of the terminal vinyl unsaturation originally present.

References Cited

UNITED STATES PATENTS

| | | | |
|---|---|---|---|
| 3,138,579 | 6/1964 | Cabaness | 260—94.9 |
| 3,331,824 | 7/1967 | Folzenlogen et al. | 260—88.2 |
| 3,130,188 | 4/1964 | Hogan. | |
| 3,285,902 | 11/1966 | Schmeidl. | |

FOREIGN PATENTS 1,419,658  10/1965  France.

JOSEPH L. SCHOFER, Primary Examiner

R. A. GAITHER, Assistant Examiner

U.S. Cl. X.R.

260—85.3, 88.2, 93.7